US008108782B2

(12) United States Patent
Rajpal et al.

(10) Patent No.: US 8,108,782 B2
(45) Date of Patent: Jan. 31, 2012

(54) DISPLAY MANAGEMENT FOR COMMUNICATION DEVICES WITH MULTIPLE DISPLAYS

(75) Inventors: Samir Rajpal, Plantation, FL (US); Hariprasad Janardana Iyer, Plantation, FL (US); Douglas E. Ross, Davie, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1071 days.

(21) Appl. No.: 11/558,390

(22) Filed: Nov. 9, 2006

(65) Prior Publication Data

US 2008/0115151 A1 May 15, 2008

(51) Int. Cl.
*G06F 3/00* (2006.01)
(52) U.S. Cl. ........ 715/761; 715/778; 715/783; 715/803; 345/173
(58) Field of Classification Search .......... 715/764, 715/761, 778, 783, 803; 345/1.2, 1.3, 173; 455/550.1
See application file for complete search history.

(56) References Cited

U.S. PATENT DOCUMENTS

| 5,467,102 | A | * | 11/1995 | Kuno et al. ............. 345/1.3 |
|---|---|---|---|---|
| 5,579,025 | A | * | 11/1996 | Itoh ................. 345/3.2 |
| 5,859,594 | A | * | 1/1999 | King et al. ............. 340/7.55 |
| 5,884,156 | A | * | 3/1999 | Gordon ............. 455/321 |
| 6,018,340 | A | * | 1/2000 | Butler et al. ............. 715/764 |
| 6,069,593 | A | * | 5/2000 | Lebby et al. ............. 345/1.1 |
| 6,144,358 | A | * | 11/2000 | Narayanaswamy et al. ... 345/102 |
| 6,297,945 | B1 | * | 10/2001 | Yamamoto ............. 361/679.04 |
| 6,304,763 | B1 | * | 10/2001 | Jahagirdar et al. ........... 455/566 |
| 6,349,221 | B1 | * | 2/2002 | Wolf et al. .............. 455/566 |
| 6,434,628 | B1 | | 8/2002 | Bowman-Amuah |
| 6,633,759 | B1 | * | 10/2003 | Kobayashi ............ 455/419 |
| 6,643,124 | B1 | * | 11/2003 | Wilk ............. 361/679.04 |
| 6,859,219 | B1 | * | 2/2005 | Sall ............. 345/1.1 |
| 6,894,661 | B1 | * | 5/2005 | Tuli ............. 345/1.1 |
| 6,937,868 | B2 | * | 8/2005 | Himmel et al. .......... 455/456.4 |
| 6,941,160 | B2 | * | 9/2005 | Otsuka et al. ............ 455/566 |
| 7,020,493 | B2 | * | 3/2006 | Ohmura et al. ........... 455/566 |
| 7,027,035 | B2 | * | 4/2006 | Youden ............. 345/169 |
| 7,123,945 | B2 | * | 10/2006 | Kokubo ............. 455/566 |
| 7,136,042 | B2 | * | 11/2006 | Magendanz et al. ......... 345/100 |
| 7,233,813 | B2 | * | 6/2007 | Kokubo ............. 455/566 |
| 7,268,747 | B2 | * | 9/2007 | Taniguchi et al. ............. 345/6 |
| 7,289,083 | B1 | * | 10/2007 | Canova, Jr. ............. 345/1.1 |

(Continued)

FOREIGN PATENT DOCUMENTS

WO WO02093429 A1 11/2002

*Primary Examiner* — Ba Huynh
(74) *Attorney, Agent, or Firm* — Cuenot, Forsythe & Kim, LLC

(57) ABSTRACT

Within a communication device having a plurality of displays, a method of controlling the displays can include, responsive to receiving an event from an application within a display manager, determining whether a single event or multiple events are pending (430). If a single event is pending, the method can include instructing the application to write data corresponding to the received event to a primary display of the communication device (435). The display manager can write data corresponding to the received event to a secondary display (445). If multiple events are pending, the method can include preventing the application from writing data to the primary display (470). The display manager can write data corresponding to the multiple events to the primary display and the secondary display without involvement of the application (475). The display manager further can launch a specific application in response to an event (500).

19 Claims, 3 Drawing Sheets

U.S. PATENT DOCUMENTS

| | | | |
|---|---|---|---|
| 2001/0049293 A1* | 12/2001 | Shimazaki | 455/550 |
| 2004/0067770 A1* | 4/2004 | King et al. | 455/557 |
| 2004/0122730 A1 | 6/2004 | Tucciarone et al. | |
| 2005/0113145 A1* | 5/2005 | Chon | 455/566 |
| 2005/0289510 A1 | 12/2005 | Illowsky et al. | |
| 2006/0003798 A1* | 1/2006 | Mizukami | 455/550.1 |
| 2006/0028395 A1* | 2/2006 | Nohara | 345/1.3 |
| 2006/0073816 A1* | 4/2006 | Kim et al. | 455/414.1 |
| 2006/0097955 A1* | 5/2006 | Kato | 345/1.1 |
| 2006/0121947 A1* | 6/2006 | Lee | 455/566 |
| 2006/0135198 A1* | 6/2006 | Lee | 455/550.1 |
| 2006/0166708 A1* | 7/2006 | Kim et al. | 455/573 |
| 2006/0211454 A1* | 9/2006 | Park et al. | 455/566 |
| 2007/0026889 A1* | 2/2007 | Yamauchi et al. | 455/552.1 |
| 2007/0072633 A1* | 3/2007 | Cheon et al. | 455/466 |
| 2007/0093276 A1* | 4/2007 | Kim et al. | 455/566 |
| 2007/0117594 A1* | 5/2007 | Ong et al. | 455/566 |
| 2007/0195007 A1* | 8/2007 | Bear et al. | 345/1.1 |
| 2008/0004082 A1* | 1/2008 | Bloebaum | 455/566 |

\* cited by examiner

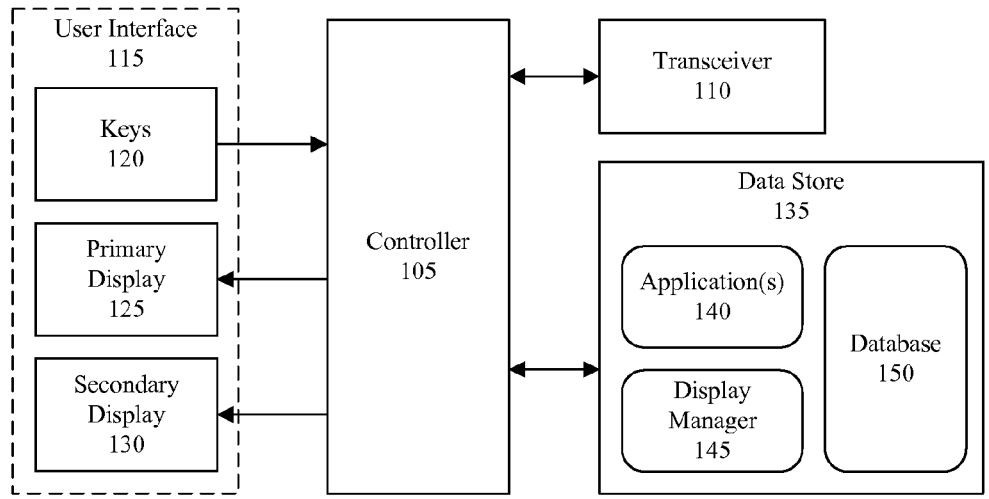
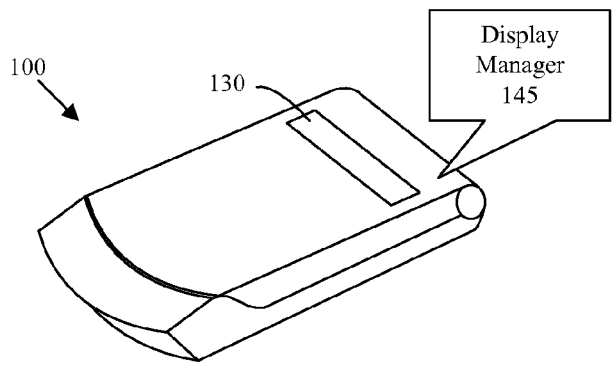
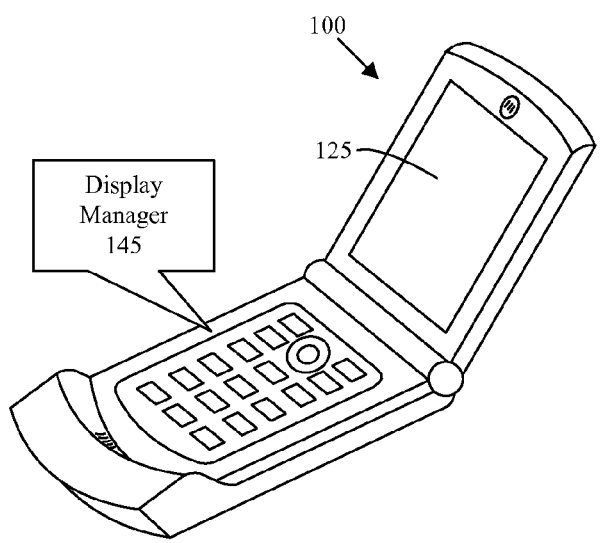
FIG. 1
FIG. 2
FIG. 3

DISPLAY MANAGEMENT FOR COMMUNICATION DEVICES WITH MULTIPLE DISPLAYS

BACKGROUND OF THE INVENTION

1. Field of the Invention

The present invention generally relates to communication devices that have more than one display and, more particularly, to managing the operation of those displays.

2. Background of the Invention

Many modern communication devices have an operating system that allows execution of software applications from third party vendors. Some mobile stations, for example, allow applications to be downloaded from Websites and executed within the communication device. In other cases, third party applications can be provided with the communication device as original equipment rather than as an "after-market" alternative.

Many of the applications available for communication devices are written to utilize a single visual display. A significant number of modern communication devices, however, have more than one display. A flip style mobile station is one example of a communication device that includes multiple displays. Typically, the communication device is configured with an external display that is visible to the user when the communication device is in the closed position and an internal display that is visible to the user only when the device is in the open position. The external display is often smaller in size than the internal display, though this need not be the case.

If an application is written to utilize only one display of the communication device, a situation may arise where the application is to notify a user of an event but is unable to access the other display. Consider the case of an alarm application that is configured to utilize only the internal display of the communication device. When an event occurs for which an alarm must be provided, the alarm application is only able to write data to the internal display of the communication device. If the communication device is in the closed position, the user is unable to view this data. Since the alarm application cannot access the external display, no information regarding the event is written to the external display. In consequence, the user may be unaware that an event has occurred or unaware of the nature of the event that has occurred.

SUMMARY OF THE INVENTION

The present invention relates to a method of controlling displays of a communication device having a plurality of displays. The method can include determining whether a single event or multiple events are pending responsive to receiving an event within a display manager from an application. If a single event is pending, the application can be instructed to write data corresponding to the received event to a primary display of the communication device. Data corresponding to the received event can be written to a secondary display by the display manager. If multiple events are pending, the application can be prevented from writing data to the primary display. Data corresponding to the multiple events can be written to the primary display and the secondary display by the display manager.

If a single event is pending, the method also can include, responsive to detecting a user input, instructing the application to remove the data corresponding to the event from the primary display. Responsive to detecting the communication device being placed in an open position where a single event is pending, the data corresponding to the event can be allowed to remain on the primary display.

If multiple events are pending, the method can include the display manager removing data corresponding to the multiple events from the primary display and the secondary display responsive to detecting a user input. When multiple events are pending, the method also can include the display manager presenting, upon the secondary display, an indication that multiple events are pending and presenting, upon the primary display, a list of the multiple events. In that case, the display manager, responsive to detecting the communication device being placed in an open position, can clear the secondary display and allow the list of the multiple events to remain on the primary display.

Responsive to receiving the event from the application, a different application can be selected within the communication device that is associated with the event. The selected application can be automatically launched.

The method further can include, responsive to receiving the event from the application, first determining whether the communication device is in an emergency mode. If so, the method can include instructing the application that multiple events are pending such that the application does not write to either the primary display or the secondary display.

Another aspect of the present invention can include a communication device. The communication device can include a plurality of displays comprising a primary display and a secondary display. The communication device also can include a display manager that receives events from one or more applications and, responsive to receiving an event from an application, selectively permits the application to write to the primary display according to whether a single event or multiple events are pending.

The communication device can be implemented as a flip style mobile station. The primary display can be an internal display. The secondary display can be an external display.

If the display manager determines that a single event is pending, the display manager can instruct the application to write event data to the primary display. The display manager can write event data to the secondary display. If the display manager determines that multiple events are pending, the display manager can instruct the application not to write data to the primary display. In that case, the display manager can write data corresponding to the multiple events to the primary display and the secondary display.

If a single event is pending, the display manager further, responsive to detecting a user input, can instruct the application to remove the event data from the primary display. If a single event is pending and the display manager detects the communication device being placed in an open position, the display manager can exit in response to allow the event data from the application to remain on the primary display.

If multiple events are pending, the display manager, responsive to detecting a user input, can remove data corresponding to the multiple events from the primary display and the secondary display. If multiple events are pending, the display manager can present, upon the secondary display, an indication that a plurality of events are pending. The display manager further can present, upon the primary display, a list of the multiple events.

The display manager, responsive to receiving the event from the application, can select a different application within the communication device that is associated with the event and automatically launch the selected application.

The display manager also, responsive to receiving the event from the application, can first determine whether the communication device is in an emergency mode. If so, the display manager can instruct the application that multiple events are pending such that the application does not write to either the primary display or the secondary display.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which:

FIG. 1 depicts a communications device that is useful for understanding the present invention;

FIG. 2 depicts the communication device of FIG. 1 in accordance with another aspect of the present invention;

FIG. 3 depicts the communication device of FIG. 1 in accordance with another aspect of the present invention;

DETAILED DESCRIPTION

Figure 4:
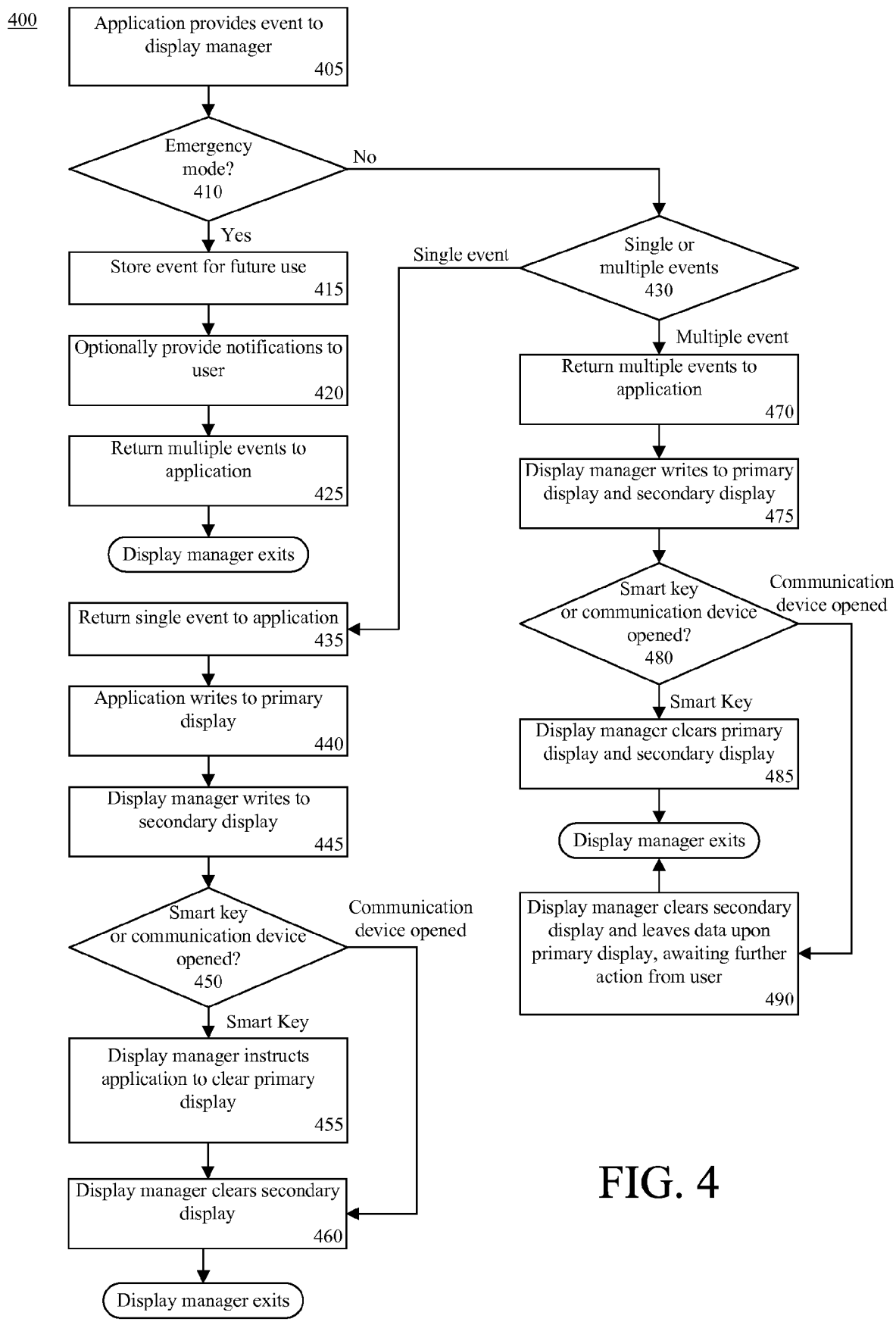
FIG. 4 is a flowchart that is useful for understanding the present invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to managing and/or controlling multiple displays of a communication device. Within a communication device having a plurality of displays, events from various applications executing within the device can be provided to, and evaluated by, a centralized application. The centralized application can coordinate with the applications to write data to the various displays of the communication device as well as remove data from such displays. Other aspects of the present invention will be described in greater detail with reference to the drawings below.

FIG. 1 depicts a block diagram of a communication device 100 that is useful for understanding the present invention. As shown, the communication device 100 can include a controller 105, a transceiver 110, a user interface 115, as well as a data storage device (data store) 135. The communication device 100 can be any of a variety of different devices that have a plurality of visual displays, i.e., a computer system with multiple displays, a portable information processing system, such as a personal digital assistant, having a plurality of displays, or a mobile station having a plurality of displays. The particular type of device is not intended to limit the present invention so long as the device is configured to function with more than one display.

The controller 105 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. These components can be coupled together to perform various processing functions as described herein.

The communication device 100 also can include a transceiver 110 that is used by the communication device 100 to communicate with a communications network (not shown) via one or more selected communication channels, i.e., protocols. In one aspect, the transceiver 110 can communicate data via IEEE 802 wireless communications, including 802.11 and 802.16 (WiMax), WPA, WPA2, GSM, TDMA, CDMA, WCDMA, direct wireless communication, TCP/IP, or any other suitable form of wireless and/or wired communication. It should be appreciated that the communication device 100 further can include more than one transceiver, i.e., a wireless transceiver and a wired transceiver, a plurality of wireless transceivers, a plurality of wired transceivers, or any combination thereof, for communicating via any of the formats described herein.

The user interface 115 can include one or more keys 120 which can be disposed within a keypad, one or more programmable keys, or both. A programmable key refers to a key that can be used to initiate any of a variety of different programmatic actions within the communication device 100. The particular programmatic action that is implemented can depend upon the particular operating state in which the communication device 100 is disposed at the time the programmable key is actuated or activated. Programmatic keys also can be referred to as "smart" keys.

The user interface 115 further can include two or more visual displays, in this case referred to as a primary display 125 and a secondary display 130. In one aspect, for example, in the case where the communication device 100 is implemented as a flip style mobile station, the primary display 125 can be located within the mobile station and, thus, only be accessible when the mobile station is in the open position. The secondary display 130 can be located on an exterior portion of the mobile station such that the secondary display 130 is visible and can be read when the flip style mobile station is in the closed position.

The user interface 115 further can include other mechanisms for obtaining user input and for providing feedback to a user of the communication device 100. For example, the communication device 100 can include various sensors that indicate whether the communication device 100 is in an open or a closed position, audio input and output transducers, a Global Positioning System (GPS) receiver, etc.

The communication device 100 also can include a data store 135 as shown. The data store 135 can include one or more storage devices, each of which can include a magnetic storage medium, an electronic storage medium, an optical storage medium, a magneto-optical storage medium, and/or any other storage medium suitable for storing digital information. In one arrangement, the data store 135 can be integrated into the controller 105.

The data store 135 can include, or store, an operating system (not shown), which can be executed by the controller 105. The data store 135 further can include one or more applications 140, which can include third party applications. Third party application(s) can refer to computer programs that are provided or are otherwise made available by vendors other than the provider or manufacturer of the communication device 100 and which can be executed by the communication device 100.

The application(s) 140 can be pre-programmed within the data store 135 at the time the communication device 100 is sold or provided to end users or can be stored within the data store 135 at some point after the communication device 100 has been provided to an end user. In one aspect, one or more or all of the application(s) 140 can be configured, or programmed, to only utilize, or be aware of, the primary display 125. In that case, one or more of the application(s) 140 would have no knowledge of the existence of the secondary display 130.

The data store 135 also can include a display manager 145, which can be implemented as a software application that, when executed by the controller 105, performs the various functions and methods described herein. In one aspect, for example, the display manager 145 can coordinate the information that is written to the primary display 125 and the secondary display 130 as the controller 105 executes one or more of the application(s) 140.

In another aspect, the display manager 145 can intercept events from various applications 140 and responsively launch applications associated with, or indicated by, such events. In still another aspect, the display manager 145 can detect an "Emergency Only" mode of the communication device 100 and prevent user access to particular functions to be described herein in greater detail.

The display manager 145 can communicate with a database 150, which also is included within the data store 135. The database 150 can be used to store events, event information received by the display manager 145, as well as a listing of event data or notifications that can be displayed when selected events are received. The database 150 also can be used to store text messages or other images that can be presented upon a display of the communication device. It should be appreciated that the particular data structure or mechanism used to store events and event related data is not intended to limit the present invention. As such, other data structures can be used in lieu of the database 150 if so desired and as may be necessary according to memory constraints of the communication device 100.

By executing the application(s) 140 and the display manager 145, the controller 105 can interact with the various portions of the communication device 100, i.e., the user interface 115, the transceiver 110, and access other data that may be stored within the data store 135.

In operation, the display manager 145 can be configured to receive events from the applications 140. Responsive to receiving some form of communication, e.g., an incoming call, a text message, etc., the application responsible for such an activity, e.g., a text messaging application, can provide an event describing the incoming communication to the display manager 145. In one aspect, the event can specify or include a copy of the entire received communication. The display manager 145 can store the event within the database 150 and respond to the application 140 with instructions regarding what information is to be presented upon one or more of the displays of the communication device 100. The display manager 145 further can work cooperatively with the application 140 to display additional information relating to the event according to any of a variety of different conditions that may be detected within the communication device 100.

FIG. 2 depicts the communication device 100 of FIG. 1 in accordance with another aspect of the present invention. As shown, the communication device 100 can be implemented as a mobile station including a display manager 145 and the other components discussed with reference to FIG. 1. The communication device 100 can be implemented as a flip style mobile station in which the secondary display 130 is disposed on an exterior portion or surface of the communication device 100. The communication device 100 is illustrated in the closed position, where the secondary display 130 can be viewed by a user. A plurality of programmable keys (not shown) also can be provided on the exterior portion of the communication device 100 so as to be available for activation when the communication device 100 is placed in the closed position.

FIG. 3 depicts the communication device 100 of FIG. 1 in accordance with another aspect of the present invention. The communication device 100 is shown in the open position and includes the display manager 145 as well as the primary display 125. The primary display 125 can be disposed on an inner portion of the communication device 100, i.e., on an inner surface of the flip-up lid or cover portion of the communication device 100.

FIG. 4 is a flowchart that is useful for understanding the present invention. FIG. 4 illustrates a method 400 of coordinating operation of a plurality of displays of a communication device in accordance with another aspect of the present invention. The method 400 can be implemented by a communication device, such as the communication device illustrated with reference to FIGS. 1, 2, and/or 3. The method 400 can begin in a state where a display manager is executing within the communication device, such as a flip style mobile station, along with one or more other applications, including third party applications.

In step 405, one of the applications in the communication device can provide an event to the display manager. As noted, the application can provide an event to the display manager to indicate that something has occurred in the communication device which requires that some form of user feedback, input, or notification to be provided. A common example is the reception of an incoming message by the communication device that the application, which provides the event to the display manager, must handle or otherwise process. Other examples can include, but are not limited to, a missed phone call, a voicemail, a picture-mail, a missed "Push-To-Talk" private call, a missed "Push-To-Talk" group call, a missed call alert, an alarm event, a calendar event, a received SMS, or the like. Regardless of the cause of the event, the application can call an application programming interface (API) provided by the display manager to provide the event to the display manager.

In step 410, the display manager can determine whether the communication device is in an emergency mode. An emergency mode typically is a mode which restricts functionality of the communication device. For example, an emergency mode can cause most, if not all, of the functionality of the communication device to be turned off or otherwise made unavailable to the user with the exception of one or more "key" functions such as the ability to place an outgoing call to 911. The operating state, i.e., whether the communication device is in the emergency mode, can be obtained by the display manager from the operating system of the communication device or another service executing within the communication device. If the communication device is in the emergency mode, the method can proceed to step 415. If not, the method can continue to step 430.

In step 415, the display manager can store the received event for possible future use. In one aspect, the event can be stored in the database of the data store of the communication device until such time as the communication device is no longer in emergency mode so that the event can be processed. In step 420, the display manager optionally can provide a notification to a user through the communication device that an event has occurred. For example, the display manager can cause some graphic indicator on one of the displays to be shown, cause a light or LED to blink or illuminate, etc. The notification can be specific or general, but only serve to notify the user of the event without prompting or permitting further action to be performed.

In step 425, the display manager can provide a notification to the application indicating that multiple events are pending. A multiple event notification from the display manager informs an application to take no further action in terms of writing to any display of the communication device. Such is the case as the application has no knowledge of other events that may be pending and require processing. The display manager is tasked with writing to one or both of the displays of the communication device in cases where multiple events are pending.

Accordingly, in the case where the communication device is in an emergency mode, the display manager informs the application that multiple events are pending. This causes the application to take no further action with respect to writing data to the primary display. In consequence, a user is unaware of the occurrence of the event unless the display manager provides some form of notification as described. In any case, without the application writing data to the display and/or prompting the user, no further processing of the event is performed by the communication device and the user is effectively blocked from accessing any functionality of the application.

After step 425, the display manager can exit. It should be appreciated that the event can remain stored within the database of the display manager, thereby allowing the processing of that event at a later time. The event is not lost. The event effectively is ignored until such time that the communication device emerges from the emergency mode.

In illustration, a communication device may be configured as a dual mode mobile station having the ability to communicate with two different networks. If the communication device has an incorrect Subscriber Identity Module (SIM) installed, the communication device may have service from the first network, but not from the second network. From the user's perspective, the communication device may simply appear to have no service at all. In that case the communication device can be placed in an emergency mode which disallows user access to many functions of the device. In this example, the communication device is placed in the emergency mode due to non-identification of the credentials of the user because of the incorrect SIM.

If a Short Message Service (SMS) communication is received over the first network, an alarm or other visual notification may be provided on a display of the communication device which gives the user access to one or more functions of the communication device. In the emergency mode, however, such functions should be restricted. By informing the application that provided the event that multiple events are pending, the application takes no action in terms of writing information to a display of the communication device. That task is left to the display manager, which exits rather than writing any such data. Accordingly, in an emergency mode, the display manager prevents user access to functions of the communication device by preventing visual notifications from being provided by application.

Continuing to step 430, where the communication device is not in the emergency mode, the display manager can determine whether a single event is pending or multiple events are pending. Multiple events, as used herein, means two or more events, i.e., a plurality of events. An event can be said to be pending when the event has been provided to the display manager, the communication device is not in emergency mode, and the event has not yet been processed or otherwise dealt with by the display manager. If a single event is pending, the method can proceed to step 435. If more than one event is pending (multiple events), the method can continue to step 470. The scenarios discussed below can be applied to situations in which user feedback needs to be provided upon one or more displays about which the application is not aware, e.g., on the secondary display 130 when the device 100 is in the closed position.

In step 435, the display manager can provide a notification back to the application indicating that a single event is pending. Upon receiving a single event notification from the display manager, the application can continue to process the event in normal fashion. Thus, in step 440, the application can write data corresponding to the event, also called event data, to the primary display of the communication device. As noted, the primary display can be an internal display. Event data, as used herein, can refer to any data which can identify the event. In one aspect event data can include notifications of the events.

In step 445, the display manager can write data relating to the event to the secondary display. As noted, the application typically is unaware of the existence of the secondary, or external, display. Thus, the display manager can be tasked with writing information to the external display without any interference or aid from the application. That is, the display manager can function completely independently of the application any time data is written to one or both of the displays of the communication device. The data written to the secondary display, i.e., the event data, can be generic in fashion or can be more specific and include one or more items of information relating to the event as may be provided by the application in the original event notification to the display manager. Thus, in one aspect, the notification can be an application specific notification that is written to the secondary display by the display manager.

In step 450, the display manager can monitor and determine whether a user input has been received while in the closed position or the communication device has been placed in the open position. A flip style mobile station typically provides one or more smart keys, for example, or other controls which allow a user to respond to a notification when the mobile station is in the closed position. Alternatively, the user can choose to open the mobile station to respond to any information presented on the external display by the display manager.

If a user input is received while in the closed position, for example, in response to the data written to the secondary display by the display manager, the method can proceed to step 455. In step 455, the display manager instructs the application to remove the data from the primary display. That is, reception of a user input, other than the opening of the communication device, while the communication device is in the closed position most likely indicates that the user does not wish to open the communication device to further deal with the event. Accordingly, the application, responsive to receiving the instructions from the display manager, removes the data that was written to the primary display in step 440. In step 460, the display manager can remove or clear event data written to the secondary display. After step 460, the display manager can exit.

If the communication device is opened, the method can proceed to step 460 where the display manager can clear the data that was written to the secondary display. The method then can continue and the display manager can exit. By exiting, the data written to the primary display from the application is left on the primary display to prompt or otherwise guide the user as to possible actions to be initiated in response to the event.

Proceeding to step 470, in the case where multiple events are determined to be pending, the display manager can notify the application that multiple events are pending. As noted, such notification causes the application to abstain from writing data to the primary, or internal, display. In step 475, the display manager can write data to the primary display and the secondary display. More particularly, with respect to the primary, or internal, display, the display manager can write data to display a list of one or more or all of the pending events. The list allows a user to choose one or more of the events from the list for further processing if the communication device is opened. The display manager can write any of a variety of notifications to the secondary display, whether a notification that multiple events are pending, a notification relating to the most recent event detected, or the like. For example, in one aspect, the display manager can write the term "Notifications" on the secondary display to indicate a plurality of pending events that require the user's attention.

In step 480, the display manager can determine whether a user input has been received while the communication device is in the closed position or the communication device has been opened. If a user input has been received, other than the opening of the communication device, while the communication device is in the closed position, the method can proceed to step 485. As noted, such a user input, e.g., activation of a smart key or other control, in response to a notification indicates that the user is not likely to open the communication device to further respond to the event. Accordingly, in step 485, the display manager can clear data that was written to the primary display and the secondary display in step 475. The method can continue and the display manager can exit.

If the communication device is opened, the method can proceed from step 480 to step 490. In step 490, the display manager can clear the event data that was written to the secondary display in step 475. As the communication device has been opened, the data written to the primary display, i.e., the internal display, can remain. Thus, for example, the event list that was written to the primary display in step 475 can be left intact to prompt the user for further action regarding one or more of the pending events. After step 490, the display manager can exit if the user chooses to exit or acknowledges (dismisses) all events in the list. It should be appreciated that the display manager can remain active until such time that the user has chosen to exit or has dealt with the various events specified within the list presented upon the primary display.

Figure 5:
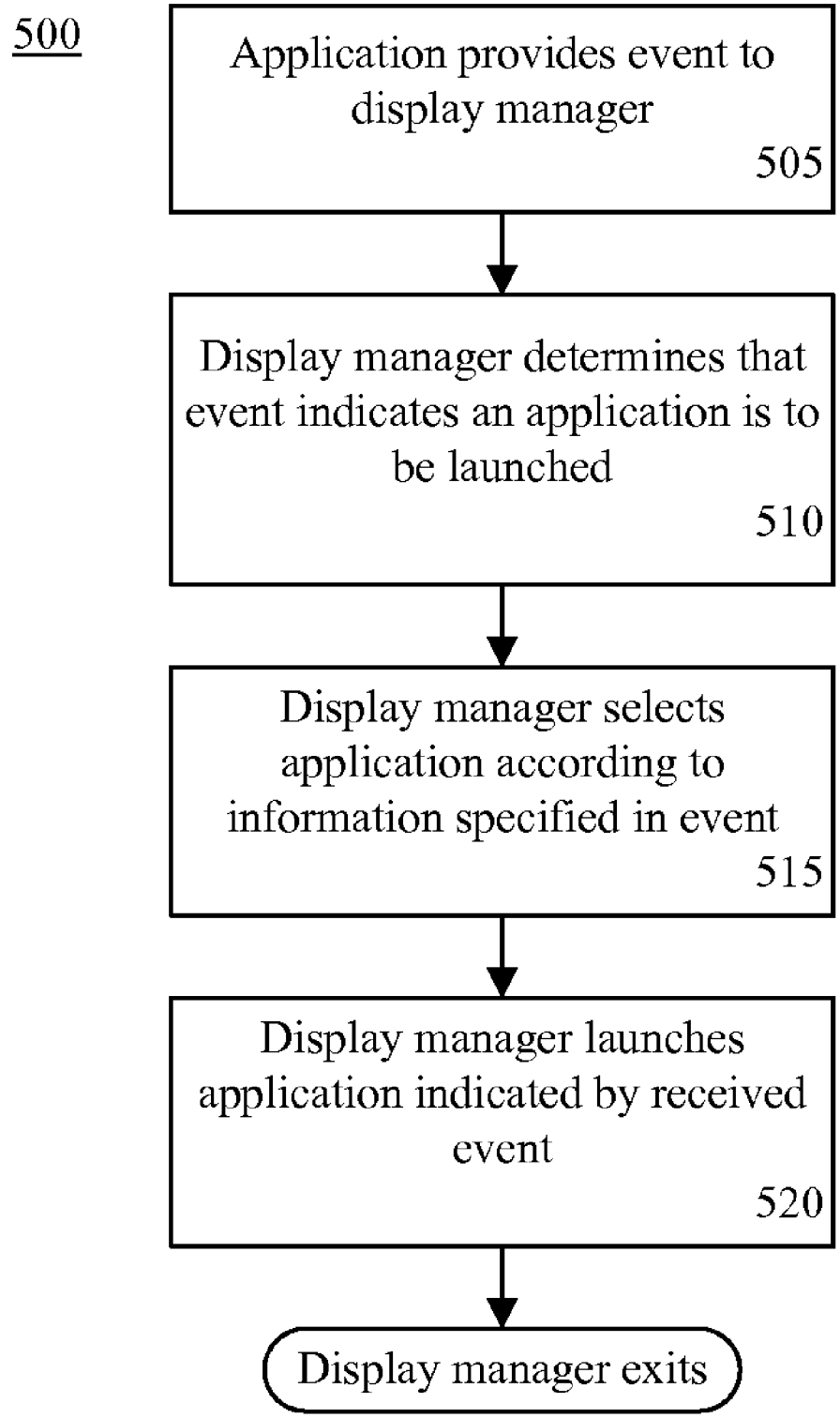
FIG. 5 is a flowchart that is useful for understanding the present invention.

FIG. 5 is a flowchart that is useful for understanding another aspect of the present invention. FIG. 5 illustrates a method 500 of selectively launching applications using the display manager. The method 500 can be performed using a communication device configured as described with reference to any of FIGS. 1, 2, and/or 3. Further, the method 500 can begin in a state where the display manager is executing within the communication device along with one or more other applications, including third party applications. In one aspect, the method 500 can be performed as a part of the method 400 of FIG. 4, concurrently with the method 400, or as needed within the communication device.

Accordingly, in step 505, an application can provide an event to the display manager. In step 510, the display manager can determine that the event indicates that an application is to be launched or executed. For example, the event can include an identifier or value which indicates that an application is to be launched. In step 515, the display manager can select an application from a plurality of applications available or stored with the communication device. In one aspect, such applications can be JAVA applications, though the present invention is not intended to be limited by the particular type of operating system and/or environment provided by the communication device.

The application can be selected according to information specified by the event. For example, the event can include an identifier that is associated with an application. The associations can be stored within the data store of the communication device, i.e., as a table, within the database, or other data structure. In step 520, the display manager can launch the selected application, i.e., the application indicated by the received event. The display manager then can exit.

The embodiments disclosed herein are directed to managing and coordinating the operation of multiple displays within a communication device. A centralized display manager can receive events from various applications within the communication device. Based upon the number of pending events at any given time, and the operating state of the communication device, the display manager directs applications as to which display, if any, the application is to write data corresponding to the events. The display manager further can write data to one or more of the displays of the communication device to work cooperatively with the applications.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. For a communication device using a plurality of displays, a method of controlling the displays comprising:
    responsive to receiving an event within a display manager from an application, determining whether a single event or multiple events are pending;
    when a single event is pending, instructing the application to write data corresponding to the received event to a primary display of the communication device without the display manager writing data to the primary display, and the display manager writing data corresponding to the received event to a secondary display without the application writing data to the secondary display; and
    when multiple events are pending, preventing the application from writing data to the primary display, and the display manager writing data corresponding to the multiple events to the primary display and the secondary display.

2. The method of claim 1, wherein a single event is pending, the method further comprising, responsive to detecting a user input, instructing the application to remove the data corresponding to the event from the primary display.

3. The method of claim 1, wherein a single event is pending, the method further comprising, responsive to detecting the communication device being placed in an open position, allowing the data corresponding to the event to remain on the primary display.

4. The method of claim 1, wherein multiple events are pending, the method further comprising, responsive to detecting a user input, the display manager removing data corresponding to the multiple events from the primary display and the secondary display.

5. The method of claim 1, wherein multiple events are pending, the method further comprising the display manager presenting, upon the secondary display, an indication that multiple events are pending and presenting, upon the primary display, a list of the multiple events without involvement of the application.

6. The method of claim 5, further comprising the display manager, responsive to detecting the communication device being placed in an open position, clearing the secondary display and allowing the list of the multiple events to remain on the primary display.

7. The method of claim 1, further comprising:
    responsive to receiving the event from the application, selecting a different application within the communication device that is associated with the event; and
    automatically launching the selected application.

8. The method of claim 1, further comprising:
    responsive to receiving the event from the application, first determining whether the communication device is in an emergency mode; and
    if so, instructing the application that multiple events are pending such that the application does not write to either the primary display or the secondary display.

9. A communication device comprising:
    a plurality of displays comprising a primary display and a secondary display; and
    a display manager that receives events from one or more applications and, responsive to receiving an event from an application, determines whether a single event or multiple events are pending;
    when a single event is pending, the display manager instructs the application to write data corresponding to the received event to a primary display of the communication device without the display manager writing data to the primary display, and the display manager writes data corresponding to the received event to a secondary display without the application writing data to the secondary display; and
    when multiple events are pending, the display manager prevents the application from writing data to the primary display, and the display manager writes data corresponding to the multiple events to the primary display and the secondary display.

10. The communication device of claim 9, wherein the communication device is a flip style mobile station, the primary display is an internal display, and the secondary display is an external display.

11. The communication device of claim 9, wherein if a single event is pending, the display manager further, responsive to detecting a user input, instructs the application to remove event data from the primary display.

12. The communication device of claim 9, wherein if a single event is pending, the display manager further, responsive to detecting the communication device being placed in an open position, exits, thereby allowing event data from the application to remain on the primary display.

13. The communication device of claim 9, wherein if multiple events are pending, the display manager, responsive to detecting a user input, removes data corresponding to the multiple events from the primary display and the secondary display.

14. The communication device of claim 9, wherein if multiple events are pending, the display manager presents, upon the secondary display, an indication that multiple events are pending.

15. The communication device of claim 14, wherein the display manager presents, upon the primary display, a list of the plurality of events.

16. The communication device of claim 9, wherein the display manager, responsive to receiving the event from the application, selects a different application within the communication device that is associated with the event and automatically launches the different application.

17. The communication device of claim 9, wherein the display manager, responsive to receiving the event from the application, first determines whether the communication device is in an emergency mode and, if so, instructs the application that multiple events are pending such that the application does not write to either the primary display or the secondary display.

18. A machine readable storage, having stored thereon a computer program having a plurality of code sections for managing usage of a plurality of displays within a communication device, the machine readable storage comprising:
    code defining a display manager that, responsive to receiving an event from an application, determines whether a single event or multiple events are pending;

wherein, when a single event is pending, the display manager instructs the application to write data corresponding to the received event to a primary display of the communication device without the display manager writing data to the primary display, and the display manager writes event data corresponding to the received event to a secondary display without the application writing data to the secondary display; and wherein, when multiple events are pending, the display manager instructs the application not to write data to the primary display, and the display manager writes data corresponding to the plurality of events to the primary display and the secondary display without involvement of the application.

19. The machine readable storage of claim 18, wherein:

responsive to receiving the event from the application, the display manager first determines whether the communication device is in an emergency mode; and the display manager instructs the application that multiple events are pending such that the application does not write to either the primary display or the secondary display if the communication device is in the emergency mode.

* * * * *